(12) United States Patent
Schroff et al.

(10) Patent No.: US 10,277,040 B2
(45) Date of Patent: Apr. 30, 2019

(54) COMMUNICATION SYSTEM FOR A BATTERY-MANAGEMENT SYSTEM FOR A BATTERY, AND METHOD FOR OPERATING AT LEAST ONE PREDEFINED COUPLING NETWORK OF SUCH A COMMUNICATIONS SYSTEM

(71) Applicant: Robert Bosch GmbH, Stuttgart (DE)

(72) Inventors: Clemens Schroff, Kraichtal (DE); Chrysanthos Tzivanopoulos, Remseck am Neckar (DE); Juergen Seidel, Baltmannsweiler (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/765,228

(22) PCT Filed: Sep. 30, 2016

(86) PCT No.: PCT/EP2016/073381
§ 371 (c)(1),
(2) Date: Mar. 30, 2018

(87) PCT Pub. No.: WO2017/063897
PCT Pub. Date: Apr. 20, 2017

(65) Prior Publication Data
US 2018/0278062 A1    Sep. 27, 2018

(30) Foreign Application Priority Data
Oct. 12, 2015    (DE) .................. 10 2015 219 666

(51) Int. Cl.
*H04B 3/00*    (2006.01)
*H02J 7/00*    (2006.01)
(Continued)

(52) U.S. Cl.
CPC .............. *H02J 7/00* (2013.01); *H02J 7/0013* (2013.01); *H04B 3/56* (2013.01); *H04L 12/10* (2013.01); *H02J 2007/0098* (2013.01)

(58) Field of Classification Search
CPC .... H02J 7/00; H02J 7/0013; H02J 2007/0098; H04B 3/56; H04L 12/10
(Continued)

(56) References Cited

U.S. PATENT DOCUMENTS

| | | |
|---|---|---|
| 2012/0317426 A1 | 12/2012 | Hunter, Jr. et al. |
| 2013/0285616 A1 | 10/2013 | Washiro |

FOREIGN PATENT DOCUMENTS

| | | |
|---|---|---|
| DE | 102011118317 A1 | 5/2013 |
| DE | 102012208444 A1 | 11/2013 |

(Continued)

OTHER PUBLICATIONS

International Search Report dated Dec. 12, 2016 of the corresponding International Application PCT/EP2016/073381 filed Sep. 30, 2016.

*Primary Examiner* — Zewdu A Kassa
(74) *Attorney, Agent, or Firm* — Norton Rose Fulbright US LLP; Gerard Messina

(57) ABSTRACT

A communications system for a battery-management system of a battery includes coupling networks that are each connected or connectable via two input-side connections to a transmission channel, and via two output-side connections to a respective one of a plurality of communications users. The transmission channel can be used for the transmission of communications signals at a transmission frequency and that are to be transmitted and/or received by the communications users during a communications process between the communications users. At least one of the coupling networks has a first and second operating state, in which an input impedance that occurs between the two input-side connections of (Continued)

the respective predefined coupling network at the transmission frequency has two different impedance amounts. A communications user allocated to a predefined coupling network can set the allocated predefined coupling network to each of its two operating states once or multiple times during the communications process.

11 Claims, 1 Drawing Sheet

(51) Int. Cl.
   *H04L 12/10* (2006.01)
   *H04B 3/56* (2006.01)

(58) Field of Classification Search
   USPC .............................. 375/257, 316, 319, 295
   See application file for complete search history.

(56) References Cited

FOREIGN PATENT DOCUMENTS

| | | |
|---|---|---|
| DE | 102013219360 A1 | 3/2015 |
| DE | 102014215830 A1 | 2/2016 |
| EP | 1772989 A2 | 4/2007 |
| WO | 2012117371 A1 | 9/2012 |

COMMUNICATION SYSTEM FOR A BATTERY-MANAGEMENT SYSTEM FOR A BATTERY, AND METHOD FOR OPERATING AT LEAST ONE PREDEFINED COUPLING NETWORK OF SUCH A COMMUNICATIONS SYSTEM

CROSS-REFERENCE TO RELATED APPLICATIONS

The present application is the national stage of International Pat. App. No. PCT/EP2016/073381 filed Sep. 30, 2016, and claims priority under 35 U.S.C. § 119 to DE 10 2015 219 666.6, filed in the Federal Republic of Germany on Oct. 12, 2015, the content of each of which are incorporated herein by reference in their entireties.

FIELD OF THE INVENTION

The present invention relates to a communications system for a battery-management system for a battery, the communications system including a plurality of communications users and a plurality of coupling networks that are allocated to respective ones of the communications users. In addition, the present invention relates to a method for operating at least one predefined coupling network of the coupling networks of such a communications system.

BACKGROUND

A communications system having a plurality of communications users and a plurality of coupling networks that are allocated to a respective communications user is known from the related art. Here, a transmission channel for the communications system is made up of two supply lines, via which a unit is connected to a consumer in order to supply the consumer with electrical energy. Each coupling network is connected to a respective other supply line of the supply lines using one of two input-side connections in each case. In addition, each coupling network is connected to the allocated communications user via two output-side connections. The coupling networks are provided to couple or decouple communications signals into or from the supply lines.

Voltages that occur on the supply lines are usually very high and are therefore not directly usable by the communications users (communications nodes). Depending on an application type of the communications system, these voltages can amount to several hundred volts. Signal voltages of the communications signals that occur during a data transmission between the communications users amount to only a few millivolt in most instances. In special cases, these signal voltages can also lie in the single digit voltage range. To allow for a safe operation of the communications system, a galvanic separation is therefore ensured between the input and the output connections of each coupling network, i.e., between a transmitter and receiver unit of each communications user and the transmission channel. Such a galvanic separation can be achieved inductively via transformers or capacitively via capacitors. In practice, such a galvanic separation usually takes place through a combination of transformers and capacitors.

Because of characteristics of the transmission channel and the data rates required during the data transmission, complex modulation and encoding methods are required in a previously mentioned communications systems. As a rule, these utilize a frequency range of several megahertz. Abrupt changes in the impedance, which lead to reflections of the communications signals that occur in the data transmission, are encountered at these frequencies, especially at the ends of the transmission channel. These reflections lead to a change in the communications signals and can cause that a decoding of the communications signals, i.e., a retrieval of information contained in the communications signals, is no longer possible on the receiver side. To reduce said changes in the communications signals, each coupling network is employed to adapt an impedance (AC current resistance) of the allocated communications user that occurs during the data transmission to the impedance of the transmission channel.

SUMMARY

According to an example embodiment of the present invention, a communications system for a battery-management system for a battery includes a plurality of communications users and a plurality of coupling networks allocated to an individual communications user. Each coupling network is able to be connected, or is connected, to a transmission channel via two input-side connections, and to the allocated communications user via two output-side connections. The transmission channel is capable of being used for a transmission of communications signals that have a transmission frequency and that are to be transmitted and/or to be received by the communications users during a communications process which is taking place between the communications users. Each of at least one predefined coupling network of the coupling networks has a first and a second operating state, in which an input impedance that occurs at the transmission frequency between the two input-side connections of the respective predefined coupling network has two different impedance amounts. In addition, each communications user allocated to a predefined coupling network is designed to set the allocated predefined coupling network to each one of its two operating states once or multiple times during the communications process.

Moreover, according to an example embodiment of the present invention, a method is performed to operate at least one predefined coupling network of a plurality of coupling networks of a communications system for a battery-management system for a battery, where the communications system includes a plurality of communications users allocated to respective ones of the coupling networks. Each coupling network is able to be connected, or is connected, to a transmission channel via two input-side connections, and to the allocated communications user via two output-side connections. The transmission channel can be used for the transmission of communications signals that feature a transmission frequency and are meant to be transmitted and/or received by the communications users during a communications process that is taking place between the communications users. The at least one predefined coupling network has a first and a second operating state in each case, in which an input impedance that occurs at the transmission frequency between the input-side connections of the respective predefined coupling network has two different impedance amounts. The method includes a step of setting each predefined coupling network to each operating state of its two operating states once or multiple times during the communications process.

The communications process can take place in a state of the communications system in which the communications users are connected to the transmission channel.

All coupling networks are preferably included in the at least one predefined coupling network.

According to an example of the present invention, the battery includes an electrical series connection of a plurality of battery-cell units, each having at least one battery cell. The series connection forms the transmission channel. Furthermore, each coupling network is allocated to a separate battery-cell unit of the battery-cell units and is switched, or is able to be switched, via its two input-side connections parallel to the allocated battery-cell unit.

In an example, the series connection preferably includes a bus bar system with the aid of which the battery-cell units are connected to one another and via which the battery is also able to be connected to a consumer. The bus bar system can be electrically conductive current bars.

At the transmission frequency, the battery-cell units of the series connection forming the transmission channel have impedances that constitute additional damping of a signal energy of the communications signals to be transmitted via the transmission channel. When using the previously mentioned bus bars in the series connection, abrupt changes in the impedance are produced at the connection points between the battery-cell units and the bus bars, which lead to reflections of the communications signals. A suitable selection of values of the two impedance amounts of the input impedance of each coupling network makes it possible to achieve a reduction in the damping of the signal energy of the communications signals generated by the transmission channel and makes it less likely that the previously mentioned reflections will be reached. Less complex modulation and encoding methods can therefore be used for the communications signals so that a reduction of the production costs of a previously described communications system is able to be achieved.

The battery-cell units in a previously described communications system are developed as individual battery cells in each case or as a battery-cell modules having a plurality of battery cells. When the battery-cell units are developed as battery cells, a battery-cell-based communication takes place during the course of the communications process. If the battery-cell units are developed as battery-cell modules, a communication that is based on a battery-cell module is carried out during the communications process.

According to an example embodiment of the present invention, the communications system includes a control unit designed to set each communications user to each of the two communications states once or multiple times during the communications process. The two communications states of each communications user that occur during the communications process include an active communications state, in which the respective communications user transmits and/or receives at least one of the communications signals. In addition, the two communications states of each communications user that occur during the communications process include a passive communications state, in which the respective communications user transmits and/or receives none of the communications signals.

In order to avoid collisions during the communications process, a time-based communication is preferably used in the communications system. The communications system preferably has a system time for the realization of the time-based communication. If the system time is available, at least one time slot, during which the respective communications user transmits and/or receives communications signals at the transmission frequency, is able to be allocated to each communications user with the aid of a bus-grant method. This bus-grant method is also termed a "time-triggered communication" or "time division multiple access" (TDMA).

When using a previously mentioned time-based communication during the communications process, each communications user is in its active communications state during the at least one allocated time slot, and otherwise it is in its passive communications state.

According to an example embodiment of the present invention, each predefined coupling network has a first impedance amount of its input impedance in its first operating state. Also, in its second operating state, each predefined coupling network has a second impedance amount of its input impedance, which is smaller than the first impedance amount of its input impedance. Each communications user allocated to a predefined coupling network is designed to set the allocated predefined coupling network to its first operating state during the communications process when its active communications state is present. In addition, each communications user allocated to a predefined coupling network is designed to set the allocated predefined coupling network to its second operating state during the communications process when its passive communications state is present.

The first operating state of each predefined coupling network preferably coincides with a coupling and/or decoupling state of the respective predefined coupling network. Each predefined coupling network that is in its coupling and/or decoupling state is able to couple communications signals at the transmission frequency into the transmission channel with a slight loss of its signal energy and/or to decouple them from the transmission channel.

The second operating state of each predefined coupling network preferably coincides with a forwarding state of the respective predefined coupling network. Each predefined coupling network that is in its forwarding state is capable of forwarding communications signals at the transmission frequency with slight damping and a slight distortion by way of its two input-side connections.

Parameters for determining optimal values of the two impedance amounts of the input impedance of each coupling network are able to be ascertained with the aid of a test, a simulation, a calculation, or an automatic learning process, for example. For instance, such an automatic learning process is able to be controlled by a communications master of the respective communications system. An automatic learning process of this kind may furthermore take place once or during each start of the respective communications system.

If the communications system for a battery-management system is to be used for a battery that is meant to be installed in a drive system of a vehicle, then an optimal transmission behavior of the transmission channel of the respective communications system is able to be ascertained in a state in which the respective communications system is installed in the vehicle. In this instance, values of the two impedance amounts of the input impedance of each coupling network that are to be adjusted in order to achieve the optimum transmission behavior agree with the previously mentioned optimal values.

According to an example embodiment, at least one first predefined coupling network of the at least one predefined coupling network has a switchable connection between its two input-side connections. Each switchable connection is non-conducting in the first operating state of the respective first predefined coupling network. In addition, in the second operating state of the respective first predefined coupling network, each switchable connection generates a short circuit for the communications signals between the two input-side connections of the respective first predefined coupling network. A short circuit for the communications signals between the two input-side connections of each first predefined coupling network is to be understood as a connection that occurs between the two input-side connections of each first predefined coupling network and that has a predefined, particularly low impedance. This predefined impedance has a low-impedance amount, especially at the transmission frequency or only at the transmission frequency, and has a value of 0Ω, for instance. Such a connection can include a capacitor and a coil, for example. Via the switchable connection of each coupling network, it is thereby possible to provide a connection between the two input-side connections of the respective coupling network that produces low damping of the signal energy of the communications signals.

Preferably, all coupling networks are included in the at least one first coupling network.

The two input-side connections of each coupling network are galvanically separated from the two output-side connections of the respective coupling network.

According to an example embodiment of the present invention, at least one second predefined coupling network of the at least one predefined coupling network includes a transformer in each case. The transformer of each second predefined coupling network is developed to convert a first voltage that is generated from a voltage applied between the two input-side connections of the respective second predefined coupling network into a second voltage, and to apply the second voltage between the two output-side connections of the respective second predefined coupling network.

According to an example embodiment of the present invention, each second predefined coupling network has no short circuit for the communications signals between its two output-side connections in its first operating state. In addition, each second predefined coupling network has a short circuit, generated by the allocated communications user, for the communications signals between its two output-side connections in its second operating state. In this instance, a short circuit for the communications signals between the two output-side connections of each second predefined coupling network means a connection that occurs between the two output-side connections of each second predefined coupling network and that has a predefined, particularly low impedance. This predefined impedance features an amount that has low resistance, especially at the transmission frequency or only at the transmission frequency, and has a value of 0Ω, for instance. Such a connection may include a capacitor and a coil, for example.

One advantage of a communications system according to this embodiment is that each short circuit for the communications signals that exists between the two output-side connections of a second predefined coupling network is also generated between the two input-side connections of the same coupling network by the transformer of the respective second predefined coupling network. In addition, each short circuit for the communications signals generated between the two input-side connections of a second predefined coupling network is also generated between connections of the battery-cell unit that are switched in parallel to the respective second predefined coupling network. As a result, an impedance amount of the input impedance of each second predefined coupling network that occurs at the transmission frequency in the absence of a short circuit for the communications signals between the two output-side connections of the respective second predefined coupling network is heavily reduced. It is noted that the transformer of each second predefined coupling network is already available for ensuring a galvanic separation between the communications user allocated to the respective second predefined coupling network and the transmission channel. Another advantage is that an already existing transmission output stage of each communications user allocated to a second predefined coupling network lends itself to the generation of the short circuit for the communications signals between the two output-side connections of the respective second predefined coupling network. It should be considered in this context that the generation of the short circuit for the communications signals between the two output-side connections of each second predefined coupling network requires simply an adaptation of a control of the transmission output stage of the communications user allocated to the respective second predefined coupling network.

All coupling networks are preferably included in the at least one second predefined coupling network.

The method according to the present invention preferably includes all of the functional features of a previously described communications system, either individually or in combination.

A previously described method preferably includes a step of setting each predefined coupling network to its second operating state by generating a short circuit for the communications signals between its two input-side connections.

A first case, which will be described in greater detail in the following text, relates to an optional type of development of at least one exemplarily selected predefined coupling network of the coupling networks of a previously described communications system. Hereinafter, the at least one exemplarily selected predefined coupling network is referred to as the first selected coupling network. In the first case, an individual input-side connection, which is able to be connected to the transmission channel, and/or an individual output-side connection, which is able to be connected to the allocated communications user, is/are used for the transmission of communications signals at the transmission frequency in the first selected coupling network. In the process, a return conduction of the corresponding communications signals takes place by way of the individual input-side connection to be used and a first mass, and/or by way of the individual output-side connection to be used and a second mass.

If the first case relates to the use of the individual input-side connection, the first selected coupling network has an input impedance between its individual input-side connection to be used and the first mass. This input impedance exhibits the same characteristics at the transmission frequency as the input impedance that occurs between the two input-side connections of each at least one predefined coupling network of a previously described communications system at the transmission frequency. As a result, the first selected coupling network also can have a first and a second operating state. The first selected coupling network is able to be switched from its first operating state to its second operating state in that a short circuit is generated for communications signals with the transmission frequency between its respective input-side connection to be used and the first mass. Furthermore, the first selected coupling network can be controlled by the allocated communications user in the same way as each predefined coupling network of a previously described communications system is capable of being controlled. In addition, the first selected coupling network is able to be operated in the same way as each predefined coupling network of a previously described communications system is capable of being operated.

A second case, which will be described in greater detail in the following text, relates to an optional type of development of at least one second, exemplarily selected predefined coupling network of the coupling networks of a previously described communications system. In the following text, the at least one second, exemplarily selected predefined coupling network is referred to as the second selected coupling network. In the second case, the second selected coupling network includes more than two input-side connections that are able to be connected to the transmission channel, and/or more than two output-side connections that are able to be connected to the allocated communications user. Here, for example, using different pairs of its input-side connections, the second selected coupling network is able to couple communications signals into the transmission channel at the transmission frequency, or to decouple them from the transmission channel, for instance. In addition, for instance, the second selected coupling network is able to transmit communications signals, which are to be transmitted and to be received by the allocated communications user, using the transmission frequency via different pairs of its output-side connections.

If the second case relates to the use of more than two input-side connections, the second selected coupling network has a plurality of input impedances, which occur between the two input-side connections of one of its pairs of two input-side connections to be used in each case. At the transmission frequency, these input impedances exhibit the same characteristics as the input impedance that occurs at the transmission frequency between the two input-side connections of each of the at least one predefined coupling networks of a previously described communications system. As a result, the second selected coupling network can have a first operating state and a second operating state that is allocated to said first operating state for each of its pairs of two input-side connections to be used. The second selected coupling network can consequently have more than two operating states. The first selected coupling network is able to be switched from each of its first operating states to the second of its allocated second operating states in that a short circuit for communications signals at the transmission frequency is generated between its respective two input-side connections. In addition, with regard to each of its pairs of two input-side connections to be used, the allocated communications user is capable of controlling the second selected coupling network in the same way as each predefined coupling network of a previously described communications system is capable of being controlled by the respective allocated communications user. Furthermore, with regard to each of its pairs of two input-side connections to be used, the second selected coupling network is capable of being operated in the same way as each predefined coupling network of an afore-described communications system is capable of being operated.

In a previously described communications system, the communications signals can have at least one further transmission frequency. With regard to each further transmission frequency, such a communications system has the same characteristics as those of the previously mentioned transmission frequency.

In the following text, exemplary embodiments of the present invention are described in detail with reference to the appended drawings, in which the same reference numerals are used for identical components. Each component is introduced once and treated as previously known when repeated, regardless of the drawing or the exemplary embodiment to which a corresponding passage of the description in which the component repeatedly occurs, refers.

DETAILED DESCRIPTION

Figure 1:
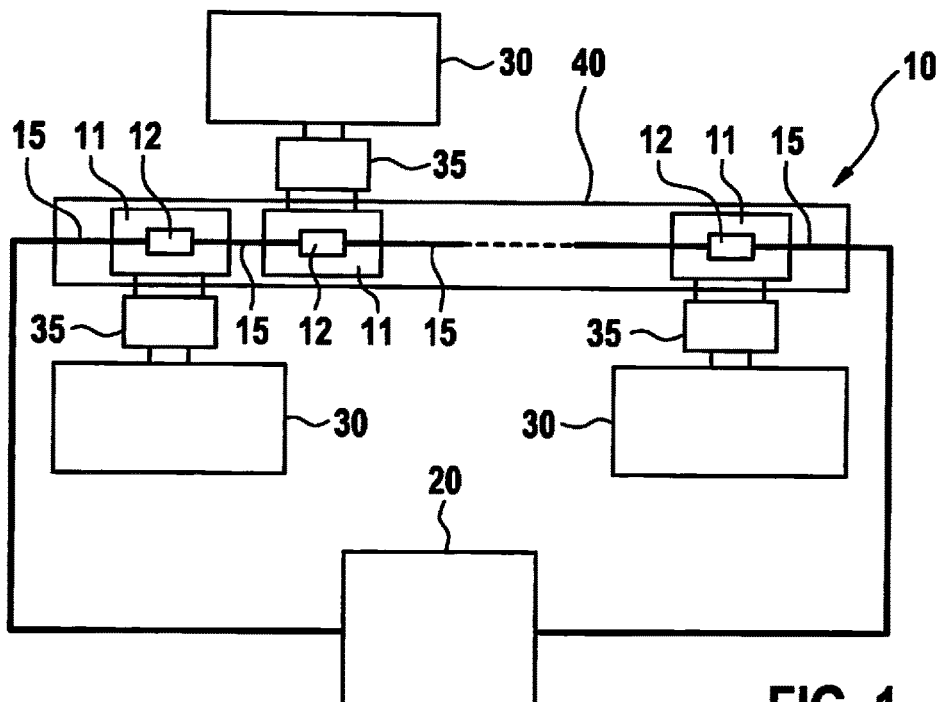
FIG. 1 illustrates a system having a battery and a communications system for a battery-management system of the battery developed according to an example embodiment of the present invention.

FIG. 1 shows a system having a battery 10 and a communications system for a battery-management system of battery 10, the communications system being developed according to an example embodiment of the present invention. Battery 10 includes a series connection having a plurality of battery-cell units 11, which are developed as individual battery cells or as individual battery-cell modules having at least one battery cell in each case. The series connection encompasses a plurality of bus bars 15 by way of which battery-cell units 11 are connected to one another, and via which battery 10 is furthermore connected to a consumer 20 of the system. The communications system includes a plurality of communications users 30 and a plurality of coupling networks 35 that are allocated to an individual communications user 30 in each case.

Each coupling network 35 is allocated to a respective battery-cell unit 11 and is switched parallel to allocated battery-cell unit 11 via two input-side connections. In addition, each coupling network 35 is connected to the allocated communications user 30 by way of two output-side connections.

The series connection of battery-cell units 11 forms a transmission channel 40 for the communications system, which transmits communications signals at a transmission frequency, the communications signals being able to be transmitted or received by communications users 30 during a communications process. In addition, each coupling network 35 is developed to couple communications signals into transmission channel 40 and/or to decouple them from transmission channel 40 at the transmission frequency during the communications process.

Each coupling network 35 includes a transformer (not shown separately), which is designed to convert a first voltage, which is generated from a voltage applied between the two input-side connections of respective coupling network 35, into a second voltage and to apply the second voltage between the two output-side connections of respective coupling network 35. Alternatively or additionally, each coupling network 35 can include a capacitor. Via the transformer and/or the capacitor of the allocated coupling network 35, each communications user 30 is galvanically separated from battery-cell unit 11 that is switched in parallel to allocated coupling network 35, and thus also from transmission channel 40.

The communications system has a system time, which allows for the realization of a time-based communication in order to avoid collisions during the communications process. To realize the time-based communication, each communications user 30 is allocated at least one time slot during the communications process. During this time slot, respective communications user 30 transmits and/or receives communications signals using the transmission frequency. Such an allocation is realized with the aid of a bus-grant method of the communications system. Each communications user 30 is in an active communications state during the at least one allocated time slot and is otherwise in a passive communications state.

Each coupling network 35 has two operating states in which an input impedance that occurs at the transmission frequency between the two input-side connections of the respective coupling network 35 has two different impedance amounts. If each coupling network 35 includes a transformer, and if a suitable control is carried out, allocated communications user 30 generates a short circuit for the communications signals between the two output-side connections of the respective coupling network 35 in order to switch each coupling network 35 from a first operating state to a second operating state. The short circuit for the communications signals that exists between the two output-side connections of each coupling network 35 is generated also between the two input-side connections of the same coupling network 35 with the aid of the transformer of the respective coupling network 35. As a result, each coupling network 35 has a first impedance amount of its input impedance in its first operating state and has a second impedance amount of its input impedance that is smaller than the first impedance amount in the second operating state. Alternatively, each coupling network 35 can include a switchable connection between the two input-side connections of the respective coupling network 35, which has a non-conducting state and a conducting state. In its conducting state, the switchable connection of each coupling network 35 generates a short circuit for the communications signals between the two input-side connections of respective coupling network 35. To switch the respective coupling network 35 from its first operating state to its second operating state, communications user 30 allocated to respective coupling network 35 switches the switchable connection of each coupling network 35 from its non-conductive to its conductive state.

A short circuit for the communications signals between the two input-side or the two output-side connections of each coupling network means a connection that occurs between the two input-side or the two output-side connections of each coupling network and has a predefined, particularly low impedance. This predefined impedance features a low-resistance amount, particularly at the transmission frequency or only at the transmission frequency, and has a value of 0Ω, for example. Such a connection can include a capacitor and a coil, for instance.

Moreover, each communications user 30 is designed to set the associated coupling network 35 to its first operating state during the communications process when its active communications state is present. In addition, each communications user 30 is developed to set the allocated, predefined coupling network 35 to its second operating state during the communications process when its passive communications state is present.

Figure 2:
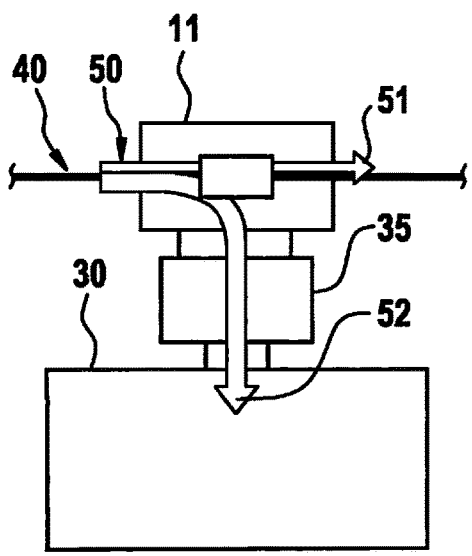
FIG. 2 illustrates a selected coupling network of the communications system in a first operating state according to an example embodiment of the present invention.

FIG. 2 shows a coupling network 35, selected by way of example and set to its first operating state, of coupling networks 35 of the communications system from FIG. 1, which hereinafter will be referred to as first coupling network 35. Also, FIG. 2 shows communications user 30 allocated to first coupling network 35, which will be referred to as first communications user 30 in the following text, as well as a battery-cell unit 11 that is connected in parallel to first coupling network 35 and will be referred to as first battery-cell unit 11 in the following text.

In addition, FIG. 2 shows a first signal-energy flow 50 of the communications signals transmitted by transmission channel 40 during the communications process when first coupling network 35 has been set to the first operating state. When crossing first battery-cell unit 11, first signal-energy flow 50 is subdivided into a first, smaller signal-energy flow component 51 and into a second, greater signal-energy flow component 52. First signal-energy flow component 51 of first signal-energy flow 50 is forwarded via first battery-cell unit 11. First coupling network 35 couples second signal-energy flow component 52 of first signal energy flow 50 from transmission channel 40 into first communications user 30.

Figure 3:
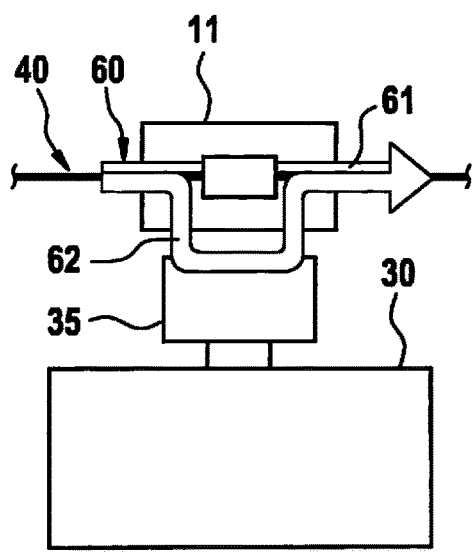
FIG. 3 illustrates the selected coupling network of the communications system in a second operating state according to an example embodiment of the present invention.

FIG. 3 shows first coupling network 35, which is set to its second operating state, as well as first communications user 30, and first battery-cell unit 11. In addition, FIG. 3 shows a second signal-energy flow 60 of the communications signals transmitted by transmission channel 40 during the communications process, which occurs when first coupling network 35 has been set to the second operating state. When crossing first battery-cell unit 11, second signal-energy flow 60 is subdivided into a first, smaller signal-energy flow component 61 and into a second, greater signal-energy flow component 62. First signal-energy flow component 61 of second signal-energy flow 60 is forwarded by way of first battery-cell unit 11. Second signal-energy flow component 62 of second signal-energy flow 60 is also forwarded, by way of the two input-side connections of first coupling network 35. In addition to the above written disclosure, reference is hereby also made to the illustrations in FIGS. 1-3 for the further disclosure of the present invention.

What is claimed is:
1. A communications system for a battery-management system of a battery, the communications system comprising:
  a plurality of communications users;
  a transmission channel usable for transmission of communication signals between the plurality of communications users during a communication process and at a transmission frequency; and
  a plurality of coupling networks, wherein each of the plurality of coupling networks is allocated to a respective one of the communications users and is connected or connectable via two input-side connections to a transmission channel and via two output-side connections to the respective communications user to which the respective coupling network is allocated;
  wherein, with respect to each of at least one of the plurality of coupling networks:
    the respective communications user to which the respective coupling network is allocated is configured to switch the respective coupling network into each of a first operating state and a second operating state one or multiple times during the communication process;
    a first value of an input impedance that occurs at the transmission frequency between the two input-side connections of the respective coupling network at the first operating state is different than a second value of the input impedance that occurs at the transmission frequency between the two input-side connections of the respective coupling network at the second operating state.

2. The communications system of claim 1, wherein:
the transmission channel is formed of an electrical series connection of a plurality of battery-cell units of the battery that each includes at least one respective battery cell; and
each of the coupling networks is allocated to a respective one of the battery-cell units and is switchable via its two input-side connections parallel to its respective allocated battery-cell unit.

3. The communications system of claim 1, further comprising a control unit, wherein the control unit is configured to switch each of the communications users to each one of two communications states once or multiple times during the communication process, the two communications states of each communications user that occur during the communication process including an active communications state, in which the respective communications user at least one of receives and transmits at least one of the communications signals, and a passive communications state, in which the respective communications user neither transmits nor receives any of the communications signals.

4. The communications system of claim 3, wherein:
the second value of the input impedance is less than the first value of the input impedance; and
each of the communications users is configured to set the coupling network allocated to the respective communications user to the first operating state whenever the respective communications user is set to its active communications state and to the second operating state whenever the respective communications user is set to its passive communications state.

5. The communications system of claim 1, wherein each of at least one of the coupling networks has a respective switchable connection between its two input-side connections, the connection being non-conducting in the first operating state of the respective coupling network and generating a short circuit for the communications signals between the two input-side connections of the respective coupling network in the second operating state of the respective coupling network.

6. The communications system of claim 1, wherein each of at least one of the coupling networks includes a respective transformer configured to:
convert a first voltage, generated from a voltage applied between the two input-side connections of the respective coupling network, into a second voltage; and
apply the second voltage between the two output-side connections of the respective coupling network.

7. The communications system of claim 6, wherein the each of the at least one of the coupling networks has no short circuit for the communication signals between its two output-side connections when the respective coupling network is in its first operating state, and has a short circuit, generated by the respective communications user allocated to the respective coupling network, for the communications signals between its two output-side connections when the respective coupling network is in its second operating state.

8. A method for operating a particular coupling network of a plurality of coupling networks of a communications system for a battery-management system of a battery, wherein the communications system includes a plurality of communications users allocated to respective ones of the coupling networks, each of the coupling networks is connected or connectable to a transmission channel via two input-side connections, and to a respective one of the communications users allocated to the respective coupling network via two output-side connections, and the transmission channel is usable for transmission of communication signals between the plurality of communications users during a communication process and at a transmission frequency, the method comprising:
switching the particular coupling network into each of a first operating state and a second operating state one or multiple times during the communication process, wherein a first value of an input impedance that occurs at the transmission frequency between the two input-side connections of the particular coupling network at the first operating state is different than a second value of the input impedance that occurs at the transmission frequency between the two input-side connections of the particular coupling network at the second operating state.

9. The method of claim 8, further comprising switching the communications user allocated to the particular coupling network to each one of two communications states once or multiple times during the communication process, the two communications states including an active communications state, in which the respective communications user at least one of receives and transmits at least one of the communications signals, and a passive communications state, in which the respective communications user neither transmits nor receives any of the communications signals.

10. The method of claim 9, wherein
the second value of the input impedance is less than the first value of the input impedance; and
the communications user allocated to the particular coupling network is configured to set the particular coupling network to the first operating state whenever the respective communications user is set to its active communications state and to the second operating state whenever the respective communications user is set to its passive communications state.

11. The method of claim 8, wherein the switching of the particular coupling network into its second operating state includes generating a short circuit for the communications signals between the two input-side connections of the particular coupling network.

* * * * *